United States Patent [19]

Kohnen

[11] 4,193,073
[45] Mar. 11, 1980

[54] METHOD AND APPARATUS FOR POSITION DETERMINATION

[76] Inventor: Hubert Kohnen, 1928-B Sparrow Dr., Point Mugu, Calif. 93041

[21] Appl. No.: 699,758

[22] Filed: Jan. 16, 1968

[51] Int. Cl.² .............................................. G01S 9/06
[52] U.S. Cl. ................................... 343/6 R; 343/7.5; 343/112 D
[58] Field of Search .................... 343/6 R, 7.5, 112 D

[56] References Cited

U.S. PATENT DOCUMENTS

| | | | |
|---|---|---|---|
| 3,250,896 | 5/1966 | Perkinson et al. | 343/7.5 X |
| 3,262,111 | 7/1966 | Graham | 343/7.5 |
| 3,336,591 | 8/1967 | Michnik et al. | 343/7.5 X |
| 3,369,239 | 2/1968 | Perkinson et al. | 343/7.5 X |

*Primary Examiner*—T. H. Tubbesing
*Attorney, Agent, or Firm*—Richard S. Sciascia; J. M. St.Amand; Q. B. Warner

[57] ABSTRACT

An electronic ranging method and apparatus for determining and optionally displaying in real time the location (or relative position) of as many as one thousand geographically-separated stations or "users" within an operational zone by means of slant range measurement and trilateration. Each "user" is assigned a specific time slot which is precision-synchronized with those of all other users, and this time slot is utilized by the unit to which it is assigned for transmitting a signal which enables range measurements to be obtained with respect thereto by a plurality of other users in its area. The range data thus derived by each user is stored in a memory bank and subsequently transmitted in sequence to one or more master stations, where a computer resolves the received information to establish accurate positional locations of the individual units. Cyclic re-synchronization of the timing equipment of each user is also provided for, as well as an arrangement whereby each user unit may act in turn as a master station for re-synchronization purposes.

6 Claims, 11 Drawing Figures

Fig.1

TIME SLOT ASSIGNMENTS

COMMUNITY DESIGNATION

|  |  | A | B | C | D | E | F | G | H | I | J | K | L |
|---|---|---|---|---|---|---|---|---|---|---|---|---|---|
| | NO. 1 | 1 | 2 | 3 | 4 | 5 | 6 | 7 | 8 | 9 | 10 | 11 | 12 |
| | NO. 2 | 13 | 14 | 15 | 16 | 17 | 18 | 19 | 20 | 21 | 22 | 23 | 24 |
| | NO. 3 | 25 | 26 | 27 | 28 | 29 | 30 | 31 | 32 | 33 | 34 | 35 | 36 |
| COMMUNITY MEMBER NUMBER | NO. 4 | 37 | 38 | 39 | 40 | 41 | 42 | 43 | 44 | 45 | 46 | 47 | 48 |
| | NO. 5 | 49 | 50 | 51 | 52 | 53 | 54 | 55 | 56 | 57 | 58 | 59 | 60 |
| | NO. 6 | 61 | 62 | 63 | 64 | 65 | 66 | 67 | 68 | 69 | 70 | 71 | 72 |
| | | - | - | - | - | - | - | - | - | - | - | - | - |
| | NO. 80 | 949 | 950 | 951 | 952 | 953 | 954 | 955 | 956 | 957 | 958 | 959 | 960 |

(EXAMPLE - MEMBER NO.3 OF COMMUNITY "E" IS ASSIGNED TIME SLOT 29 & DESIGNATED AS E3)

MEMBER NO.1 OF EACH COMMUNITY IS THE SUB-MASTER FOR THAT GROUP

METHOD AND APPARATUS FOR POSITION DETERMINATION

The invention described herein may be manufactured and used by or for the Government of the United States of America for governmental purposes without the payment of any royalties thereon or therefor.

In a broad sense the concept herein disclosed is directed to a method and apparatus for indicating at each of a plurality of units within a given region or zone the location (or relative position) of each of the remaining units within such zone. Any particular unit may be either airborne or ground-based. Although applicable to any situation in which an accurate determination of range and azimuth bearings between plural stationary and/or mobile units is required, the invention is particularly applicable to military operations in which continuous location data on all units of friendly forces is essential for command and control functions. Under such conditions, a reliable reporting system is required which will provide accurate, rapid, continuous and comprehensive friendly-unit position determination and navigation information to all elements participating in the mission.

BACKGROUND OF THE INVENTION

Present methods of determining the location of front-line friendly units, command posts and mobile forces are inaccurate to the point of inhibiting the efficient employment of both air and ground support. The time-consuming procedure of map reference and visual sighting is a manual task which is mangified by the inadequate methods of exchanging such information among all elements of a landing force. Consequently, there must be established an integrated sub-system structure of position location and navigation equipment which will derive and disseminate timely, automated and up-dated information.

A concept of operation is herein proposed which provides self-contained, readily-portable equipment capable of transmitting range pulses in the UHF band and relaying the range data of additional transmitters that may be assigned to other operational forces. A synchronized time-zero and a slot-time-reporting sequence permits master installations to receive and record all such emitted pulses and to position-fix the location of all units of the system with a high degree of accuracy by means of trilateration. The digital-data-transmission capability of the system can provide navigational guidance for amphibious and wheeled vehicles as well as for helicopters and fixed-wing aircraft. Through the exchange of target information between units, control over the firing of artillery and missiles may be achieved. To accomplish these objectives, the invention provides for the establishment of primary master and sub-master stations which will receive, process and optionally display the signals received from all of the ranging units in a visual presentation identifying and locating such units with geographical precision.

A feature of the present concept resides in its ability to overcome the line-of-sight attenuation problem by providing alternate routes for range and data transmission. This results from the capability of each ranging unit employed in a given operational situation to relay to the master station range data respecting all other units in its vicinity.

It is a further feature of the present concept that each "user" within a military force (or spatial region) is capable of transmitting its own ranging pulse and data block, ranging on other units, and relaying the memorized range and data block of such other stations or units on a time-ordered basis within an assigned time slot. The basic equipment for accomplishing this objective consists of a clock module, a ranging data transmitter, a data control logic module, a ranging data receiver, and a data relay transmitter. The ranging equipment automatically computes the range to a transmitting unit from the beginning of the unit time slot until the time of receipt of the signal. All units are "counting in time" with each other synchronously and transmitting within an assigned time slot automatically. Each receiving unit computes the range to the transmitting unit and stores the computed range data in a memory unit until the completion of that unit's ranging cycle. A relaying sequence then commences which permits each unit to relay the computed range information in a time-ordered sequence to the master station on an assigned frequency. The transfer of data by direct transmission or alternate path relay overcomes the limitations of terrain obstacles to UHF transmissions without the requirement for an airborne relay capability.

The remainder of the disclosed system consists of one or more master stations each of which includes a clock module, a ranging data transmitter, a ranging data receiver, a re-synchronization logic module, a control logic module, an antenna and a relay data receiver. The master station receives the ranges and data block information from the ranging units either directly (if line-of-sight transmission permits) or indirectly through the relay capability of the ranging units. A computer assimilates the ranging information, and, by trilateration (that is--by ascertaining the size and shape of a triangle by measuring each of its three sides), determines the relative position of all using units. The relative position of the using units thus computed can readily be converted into a geographic coordinate system by determining the orientation of the entire set of measured triangles with respect to any known reference, such, for example, as a north asimuth determined by a gyro-compass.

It will now be recognized that a principal objective of the present concept is to provide a highly accurate ranging method and apparatus capable of providing continuous location data on a plurality of stations or units the individual positions of some or all of which may be undergoing constant change. The invention herein discloses is particularly applicable to situations where presently-known equipment is either inoperative or insufficiently accurate, or where the size and weight of the necessary apparatus precludes its use. The system of the present disclosure is designed to supplement or replace the use of radar, IFF, beacons and tactical data systems employing automatic communication links to process position information after it has been collected by radar or voice reporting. The simplicity and reliability of the present apparatus also renders it particularly suitable for employment as a collision-avoidance system for both military and commercial aircraft.

SUMMARY OF THE INVENTION

The present disclosure relates to a real-time location and display method and apparatus for aircraft alone, or for airborne and ground stations together as part of an integrated unit. The system includes a master station (which may shift from unit to unit of the group) and a two-way data link which is established between each of the units and the master station, enabling each station to determine its range from every other station in its vicinity. This information, when transmitted to the master station and fed into a computer, establishes the legs of a number of side-sharing triangles. By means of trilateration, the position of each station in the group may be determined with respect to each other station. If the geographical orientation of any single portion of the display is known, the precise geographical location of each station of the group is automatically determined. Each station has a precision clock by means of which a time slot for transmission may be assigned to it, so that the assignment identifies a particular station. The information computed at the master station is redistributed to each unit of the group, permitting each such unit to ascertain its particular position with respect to all other units of the group. The system thus provides collision-avoidance capability as well as attack data to aircraft for close air support in a military operation. Vectoring data is also available to aircraft for resupply and reconnaissance purposes.

One object of the present invention, therefore, is to provide an electronic ranging method and apparatus for determining with a high degree of accuracy the geographical location of a number of fixed and/or mobile units within a certain region or zone.

A further object of the invention is to provide a highly accurate ranging system which may serve as collision-avoidance equipment for aircraft.

An additional object of the invention is to provide a system especially adapted for military operations and designed to locate and display in real time the positions of unit commanders, fire support weapons and cooperating aircraft in two dimensions with altitude readout, if desired, all of which may be superimposed on a geographical map.

A still further object of the invention is to provide a highly accurate ranging system, especially adaptable to military operations, which will provide firing data to ground weapons, attack data to aircraft for close air support, and vectoring data to aircraft for resupply and reconnaissance purposes.

Other objects, advantages, and novel features of the invention will become apparent from the following detailed description of the invention when considered in conjunction with the accompanying drawings.

BRIEF DESCRIPTION OF THE DRAWINGS

FIG. 2b is a graph illustrating ranging pulse periods and relay periods for the communities of FIG. 2a;

DESCRIPTION OF THE PREFERRED EMBODIMENT

The present concept is based upon the addition of a range relay system and a cyclic re-synchronization system to a plurality of transmitters and receivers in a time-ordered arrangement that transfers digital messages and measures slant range among a number of cooperative users of L-band radio-frequency pulse transmitters and receivers. In the embodiment to be hereinafter disclosed in detail, each predetermined, precision-clock-actuated "time slot" used for L-band ranging, range measurement and message transmittal is followed by a series of "data relay time slots" which are also predetermined and clock-actuated, so that both range measurement and digital messages are relayed to a master station by each user in his turn. Assuming that there are seventy to eighty units in each user group, there will be seventy to eighty "data relay time slots" following each L-band "time slot", and each group will relay data to the master station on a different UHF frequency, so that the "data relay cycles" of each group can overlap the ranging time periods.

In order to uniquely relate the position-determination triangles generated by the units of the present concept to a set of coordinates, the location of one triangle vertex and the azimuth of one triangle side must be determined, and hence an azimuth determination device is employed to orient at least a basic triangle. The side of this basic triangle common to a second triangle will orient the second triangle, and a third triangle can be oriented by sharing a side with the second triangle. The process is continued until all the triangles of the system have been oriented.

Figure 1:
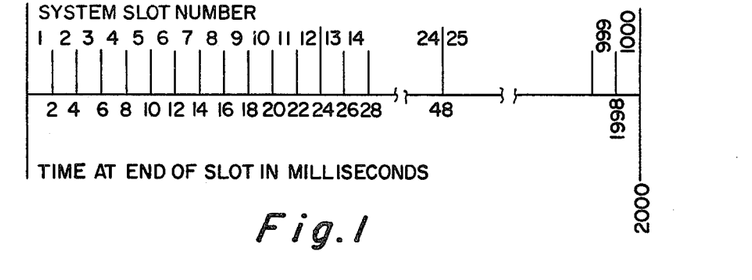
FIG. 1 is a chart showing the individual time-slot assignments for an assumed number of 1,000 user units employing the principles of the present invention.
Figure 2A:
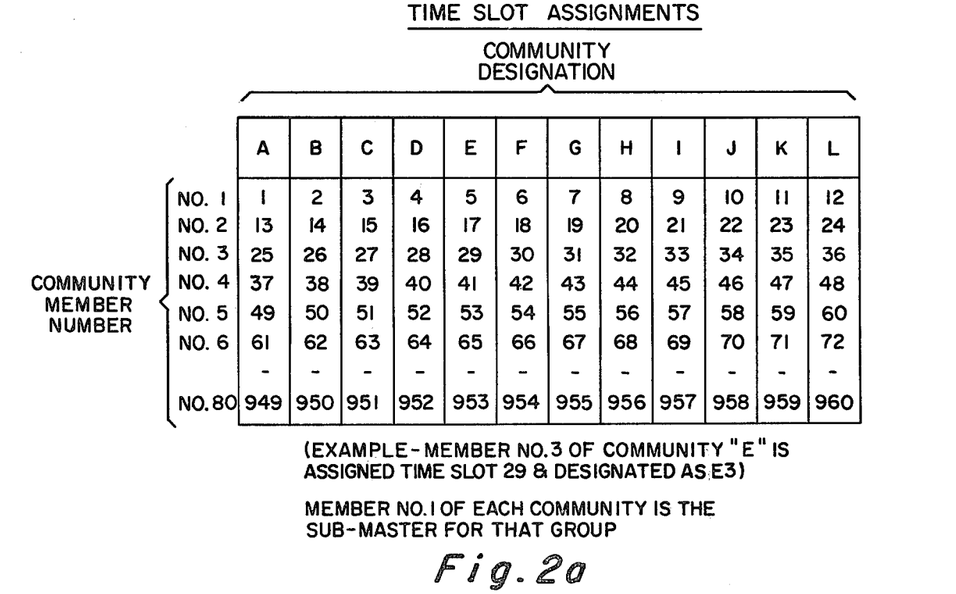
FIG. 2a is a table indicating the manner in which a time slot number may be assigned to each member of the various communities utilizing the present concept.

The system herein disclosed is designed to measure the positions of up to one thousand users on a cyclic basis, making a measurement of each user periodically, say, for example, once every two seconds. For reference in the discussion to follow, each user is numbered consecutively from one to one thousand, as shown in FIG. 1 of the drawings. Each user thus numbered is assigned a 2-millisecond slot in sequence for its own exclusive time of transmission. The one thousand users are divided into twelve communities of eighty users each, thus leaving slot numbers 961 to 1,000 unused. Every twelfth slot number is assigned to a given community, as shown in FIG. 2a of the drawings.

Figure 2B:
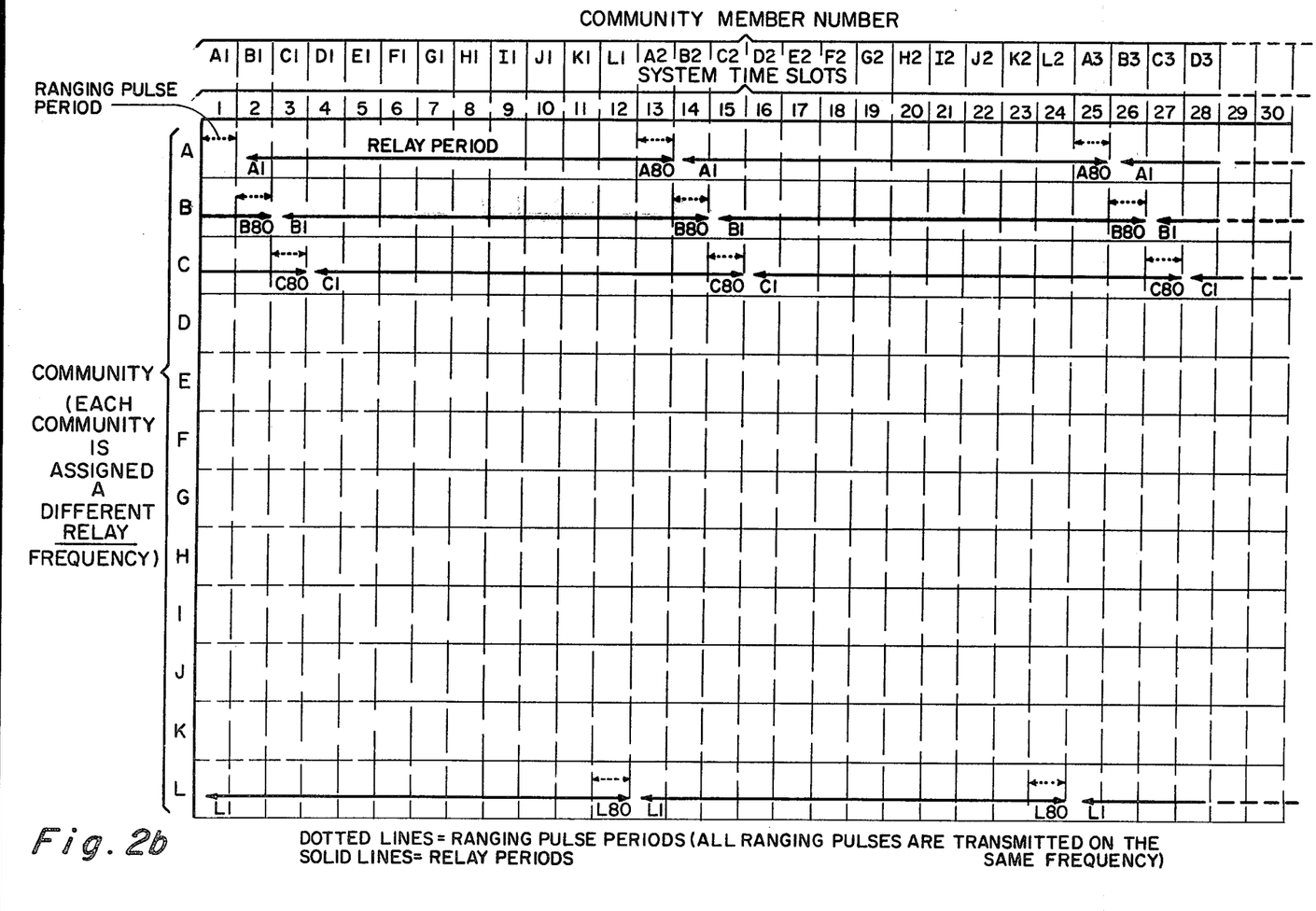
Figure 3:
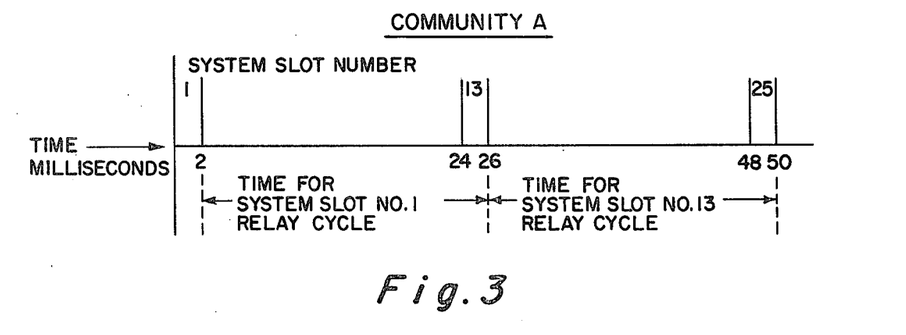
FIG. 3 is a chart showing the manner in which specific system slot numbers and relay cycles are utilized by members of one of the communities of FIGS. 2a and 2b.

All one thousand users transmit the basic range information on the same frequency. However, each community utilizes a separate relay frequency to re-transmit data from user to master station. Within each community a user transmits its range pulse, and then the time corresponding to 12 additional time slots is used to relay previously-stored range information from the cycle just passed, as illustrated in FIG. 2b. This sub-division of time is shown in FIG. 3 of the drawings for the first two members A1 and A2 of community A, member number 1 employing the first two-millisecond time period for its ranging pulse, (transmitted at one frequency and received by other members) with the next 24-milliseconds being used by the relay transmitters of the other members of that community, on a different frequency, to read out their respective stored memories. The 24-millisecond period is divided into 80 sub-slots of 300-microseconds each, so that the precise time of transmission for each member is 300 microseconds. Member number 2 then transmits a ranging pulse in time slot #13, (see also FIGS. 2a and 2b) following which all other members of community A which have received this ranging pulse relay the information to the sub-master station A1 on a pre-assigned frequency, this relaying occurring during a 24-millisecond period as before. The total elapsed time is now 50 milliseconds (FIG. 3).

Figure 4:
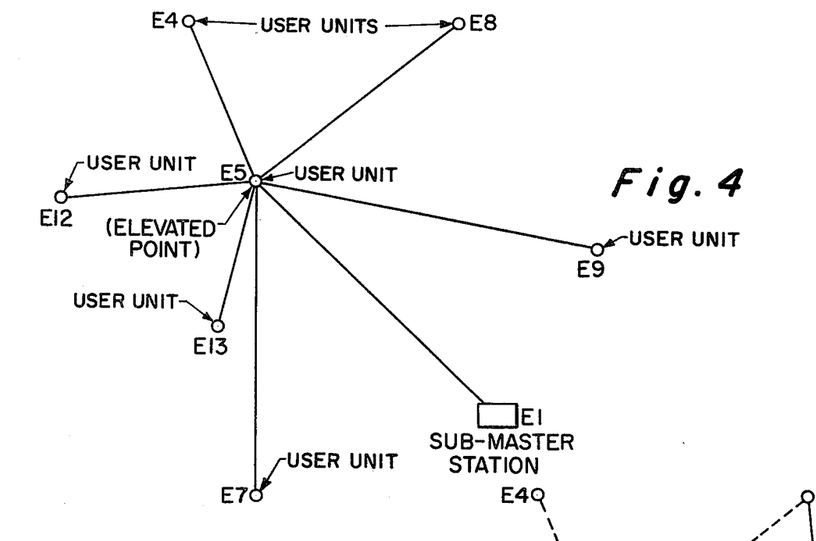
FIG. 4 illustrates one possible geographical layout of a number of user units and a single sub-master station in a system designed according to the present concept.

The above will be better understood by consideration of the following example indicating one possible operating sequence. Referring to FIG. 4 of the drawings, there is illustrated one possible geographical distribution of a number of users or stations of a system such as contemplated by the present concept. Let it be assumed that it is now the predetermined, precision-clock-actuated time for user unit number E5 to transmit on his L-band equipment, and that his equipment is at an elevated point.

Thus, at time zero of his "time slot", user number E5 transmits a series of pulses which comprise his ranging signal. Assume now that this signal is received by user units number E4, E7, E8, E9, E12 and E13 (as shown in FIG. 4) as well as the sub-master station E1. Each of these "listening" users maintains the same time due to their identical precision-synchronized clocks. Thus each may determine directly from the pulse transit time the range from user number E5 to itself. This computed range is then stored by each "listener" in its own small temporary memory until the data relay cycle which follows.

Upon the completion of the time slot assigned to user number E5, the data relay cycle in which this range information is relayed to the sub-master station E1 commences. The data relay cycle consists of a number of additional "data relay time slots" (FIGS. 2b and 3) which are assigned to the various user units in turn.

Since user units numbers E2 and E3 (not shown in FIG. 4) did not receive the signal from user unit number E5 for some reason such as because of unfavorable terrain, no information will be transmitted from these units during the second and third "data relay time slots" of the data relay cycle.

However, user unit number E4 did receive the signal from number E5, and transmits this information. However, this signal (according to the assumed sketch of FIG. 5) for some reason is not received by the sub-master station E1, and hence the information therein is lost. Since user unit number E5 is the user unit relative to which ranges are being measured, there is no data transmitted during relay slot number E5. User unit number E6 (also not shown in FIG. 4) did not receive the signal from number E5, and thus no data is transmitted during data relay slot number E6.

Figures 5, 6:
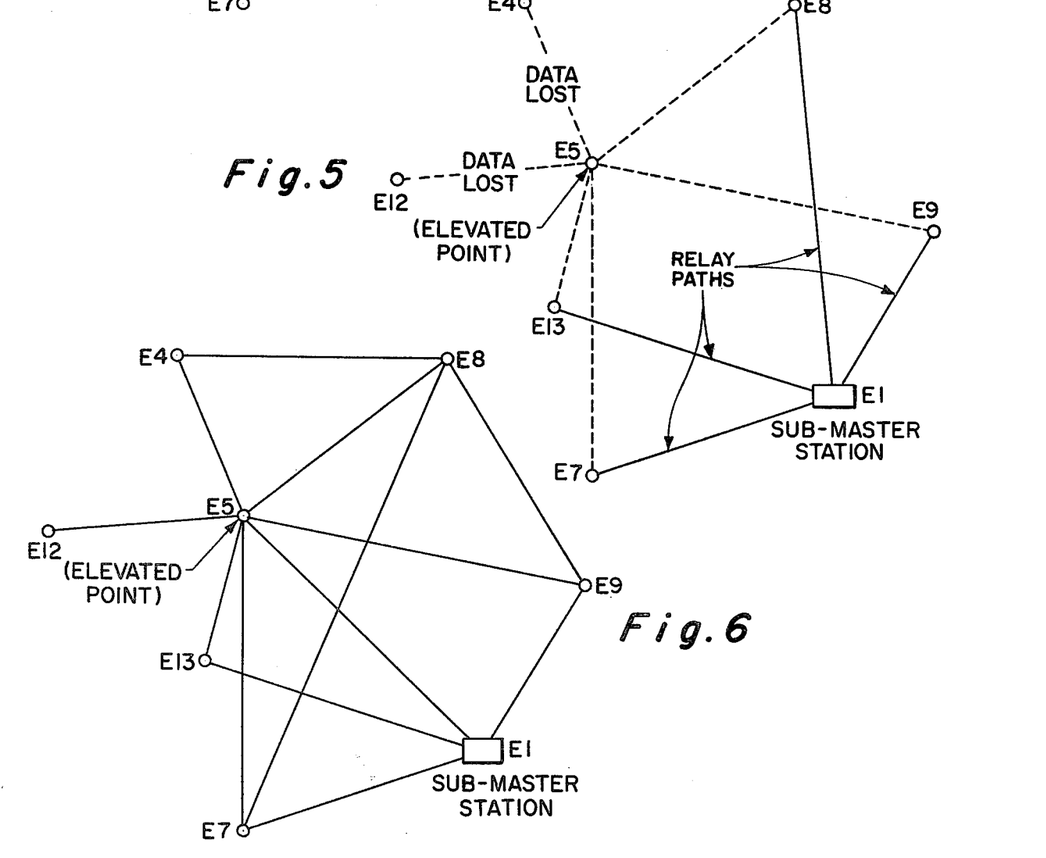
FIG. 5 indicates possible data relay transmission paths from the user units to the master station of FIG. 4.
FIG. 6 indicates the manner in which the principle of trilateration is employed to determine the relative positions of the user units of FIGS. 4 and 5.

Units number E7, E8 and E9 are all in line-of-sight with the sub-master station E1. Thus in data relay time slots numbers E7, E8 and E9, each of these users reports to the sub-master in turn its stored range data--that is, its own slant range from user unit number E5. Subsequent to additional unused data relay slots for units E10, E11 and E12 an additional range from unit number E13 is received at the sub-master station E1 in data relay time slot number E13. If there are additional units (for example, numbers E15 through E80) then additional data relay slots are reserved for reports from such additional units.

Following the completion of this data relay cycle (for unit number E5) the information represented by the broken lines of FIG. 5 is stored at the sub-master station E1. In addition, of course, the sub-master station E1 receives the range signal directly from user unit number E5 (FIG. 4), and has stored this information also. The solid lines of FIG. 5 indicates the paths over which this range information has been relayed to the sub-master station E1 from user units E7, E8, E9 and E13.

During subsequent ranging and data relay cycles, additional ranges are measured and relayed to the sub-master station E1 on a controlled time schedule. One example of such a schedule is set forth in the following table:

| TIME IN MILLISECONDS | (ZERO TIME STARTS 2-SECOND CYCLE) | | |
|---|---|---|---|
| 104 | USER E5 IN TIME SLOT #53 TRANSMITS RANGING PULSE-SIGNAL RECEIVED AT SEVERAL LOCATIONS | | |
| 106 | | | |
| 106.3 | RELAY E1 | (SUB-MASTER; DOES NOT RELAY) | |
| 106.6 | E2 | | |
| 106.9 | E3 | | |
| 107.2 | E4 | TRANSMITS RANGE TO E5 | |
| 107.5 | E5 | | ON |
| 107.8 | E6 | | FREQUENCY |
| 108.1 | E7 | TRANSMITS RANGE TO E5 | ASSIGNED TO |
| 108.4 | E8 | TRANSMITS RANGE TO E5 | COMMUNITY |
| 108.7 | E9 | TRANSMITS RANGE TO E5 | "E" |
| . | . | | |
| 128.5 | E75 | | |
| 106 | USER F5 IN TIME SLOT #54 TRANSMITS RANGING PULSE-SIGNAL RECEIVED AT SEVERAL LOCATIONS | | |
| 108 | | | |
| 108.3 | (F COMMUNITY RELAYS ON "F" FREQUENCY) | | |
| . | | | |
| 130.5 | | | |

| TIME IN MILLISECONDS | (ZERO TIME STARTS 2-SECOND CYCLE) | | | |
|---|---|---|---|---|
| 108 | USER G5 IN TIME SLOT #55 TRANSMITS RANGING PULSE-SIGNAL RECEIVED AT SEVERAL LOCATIONS | | | |
| 110 | | | | |
| 110.3 | RELAY | G1 | (SUB-MASTER; DOES NOT RELAY) | |
| 110.6 | | G2 | TRANSMITS RANGE TO G5 | |
| . | | . | | |
| . | | . | | |
| . | | . | | |
| 111.5 | | G5 | TRANSMITS RANGE TO G5 | ON |
| 111.8 | | G6 | | FREQUENCY |
| 112.1 | | G7 | | ASSIGNED TO |
| 112.4 | | G8 | TRANSMITS RANGE TO G5 | COMMUNITY |
| | | . | | "G" |
| . | | . | | |
| . | | . | | |
| 132.5 | | G75 | | |
| 128 | USER E6 IN TIME SLOT #65 TRANSMITS RANGING PULSE-SIGNAL RECEIVED AT SEVERAL LOCATIONS | | | |
| 130 | | | | |
| 130.3 | RELAY | E1 | (SUB-MASTER; DOES NOT RELAY) | |
| 130.6 | | E2 | TRANSMITS RANGE TO E6 | ON |
| 130.9 | | E3 | | FREQUENCY |
| . | | . | | ASSIGNED TO |
| . | | . | | COMMUNITY |
| . | | . | | "E" |
| 154.5 | | E75 | | |

At the end of a complete set of cycles of ranging and relay, the information received by the sub-master station E1 has permitted the development of a net of triangles as shown in FIG. 6 of the drawings. The line from user number E5 to user number E12 is shown as a portion of an incomplete triangle to illustrate that there can be internodal visibility problems such that user number E12 cannot be "seen" by any of the others shown except user number E5. However, when a number of the users are at elevated points (such as aircraft) these problems are greatly minimized.

It will now be recognized that the provision of precise time synchronization of all units and the assignment of a predetermined order of transmissions according to schedule acts as a substitute for the "address codes" frequently employed in other forms of range-measurement systems. In the present concept, only one user station or relay is transmitting at any one time. Since knowledge of the schedule permits identification of each user and relay, the amount of information transmitted during a single measurement by the present system is at a minimum.

From an examination of FIG. 6 of the drawings, it will be recognized that all desired lengths of the various sides of the triangles and all angles therein may be determined or calculated by the computer, but that the geographical orientation of the entire set of measured triangles cannot be ascertained with respect to any particular reference point. However, auxiliary means for establishing an azimuthal reference may be readily incorporated into the system (such as by a north-seeking gyro-compass) in order to determine the azimuth of at least one line anywhere in the network of triangles. Then, since all angles are known in the computer, the azimuth of all lines may be readily ascertained. As an alternative, orientation of the trilateration network may be brought about by utilizing information obtained from a satellite navigation system. Although azimuthal orientation of the trilateration network is not always necessary for all users of a position-location system of the type described, it is required for accurate alignment with maps and for optimum utilization of any device operating with angular input data such as radars or artillery. Accurate azimuths are also obviously necessary for aircraft navigation to insure a common directional reference.

Figure 7:
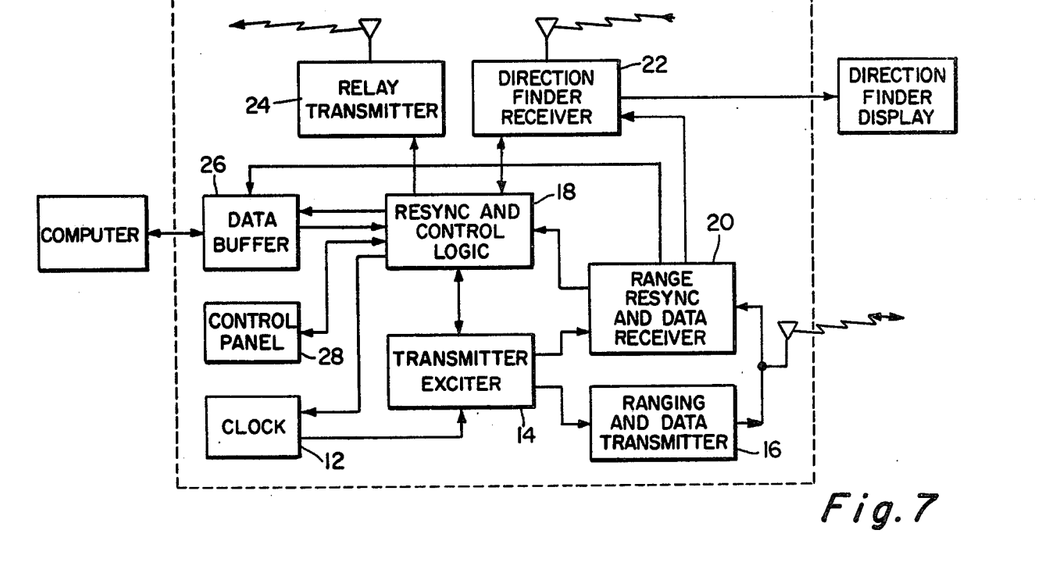
FIG. 7 is a block diagram of one preferred form of apparatus employed in carrying out the principles of the present concept.

In FIG. 7 of the drawings is shown within the broken lines a block diagram of one form of apparatus capable of performing the functions of one of the "user" units above described. Although the details of this apparatus may vary within rather wide limits, it is preferably designed to be effective over a range of approximately 100 nautical miles and have an accuracy of ±20 feet over such range. It has been ascertained that an operating frequency of 1545 megacycles is especially satisfactory, and, in order to cover the 100 nautical mile range desired, the ranging power output of the system should be in the neighborhood of 1,000 watts.

The system of FIG. 7 includes a clock 12 which can be in the form of a stable 5-megacycle oscillator. The technique of cooperative re-synchronization (hereinafter to be described) assures that corresponding clocks of all units of the system will oscillate in step within ±0.05 microsecond. Furthermore, the oscillator should remain within specified tolerances for approximately 120 seconds without requiring re-synchronization.

The output of the clock 12 is applied to a transmitter-exciter unit identified in the drawing by the reference numeral 14. The function of this unit 14 is (1) to multiply the stabilized 5-megacycle frequency to 1545 megacycles for application to a ranging and data transmitter 16, (2) to furnish a bi-phase modulated output to the transmitter 16 in response to digital signals received from a re-sync unit 18, and (3) furnish a stable 1500 megacycle signal to a range data receiver 20 and thence to a direction-finding receiver 22. Although capable of design variations, it is desirable that the transmitter-exciter unit 14 of FIG. 7 operate on a bandwidth of 3 megacycles and have a peak power output of approximately 0.5 watt. The function of the ranging and data transmitter unit 16 of FIG. 7 is to amplify the 1545 megacycle bi-phase modulated output signal received from the transmitter-exciter 14 so as to reach a peak power output of approximately 1,000 watts. It is preferred that approximately 90% of this generated power lie within 3 megacycles of the band center.

The range re-sync and data receiver 20 of FIG. 7 operates to detect bi-phase modulated pulses from cooperating unit location transmitters (as in FIG. 5) and to furnish signals for processing. It preferably operates with a bandwidth of 15 megacycles.

The re-sync and control logic unit 18 of FIG. 7 has three performance modes of operation. Firstly, it operates as a master sync unit, in which it provides a coarse synchronizing signal; secondly, it operates as a slave unit in which it provides a fine sync signal; and thirdly, it functions as a sub-master, in which it alternately transmits a coarse sync signal and listens for a fine sync response. Upon receiving such a fine sync response, it automatically computes the range to the responding unit. In addition to the above, the re-sync unit 18 also performs the functions of message slot counting, synchronization, load switching, range measuring, message encoding, clock frequency multiplying for logic, clock frequency control, relay data buffing, and, finally, time slot agility.

The message encoding circuits of unit 18 of FIG. 7 provides the relay transmitter 24 with a digital preamble and seventy-five bits of data. Zeros are provided in plate of missing data. In performing the above operations, it provides modulation control for the relay transmitter 24, fine frequency control for the clock 12, clock signals to a data buffer 26, and a slot count to a control panel 28, such count being preferably in the form of a 3-bit Barker code.

The data buffer unit 26 acts to provide a temporary storage capacity of seventy-five bits of information expandable to one hundred twenty-five bits from an external source (not shown). It is designed to receive data pulses of 1-microsecond duration every 3 microseconds from the range re-sync and data receiver 20 of FIG. 7. It also receives data clocking from the re-sync unit 18.

Control panel 28 provides on-off power control for the system, manual selection of the slave message slot, controls for transmission of "acknowledge" and "terminate" messages, and, finally, displays for (1) assigned slave slot number, (2) mission number, (3) mission terminate, (4) receiving data, and (5) direction-fining operation.

The function of the direction-finding receiver 22 of FIG. 7 is to detect the phase difference between signals received from a cooperating synchronized transmitter via two fixed-spaced diversified dipole antennas. It provides an output proportional to the phase angles of the received signal, and is preferably designed as a dual-channel receiver fixed-tuned to 1545 megacycles. It should possess a 60-db spurious response rejection and a noise figure of 12 db. An angle accuracy of $\pm 0.5°$ within $\pm 10°$ straight ahead, deteriorating to $\pm 4°$ from $\pm 10°$ to $\pm 60°$ straight ahead is desirable. It provides a $\pm 4.5$ volt analog 10-bit binary digital output.

Relay transmitter 24 relays, upon command of the re-sync logic unit 18, the data contained in the data block of the preceeding ranging unit. It also relays the computed range to the same ranging unit. Operation upon a frequency of 385 megacycles is preferable.

CLOCK SYNCHRONIZATION

It is essential for successful operation of the system above set forth that the clocks of each of the user units be maintained in substantially exact synchronism with one another in order to attain the required time-ordered cycle without the necessity of employing identification codes. This is brought about by means of a particular re-synchronization technique the details of which will now be described.

Figure 8:
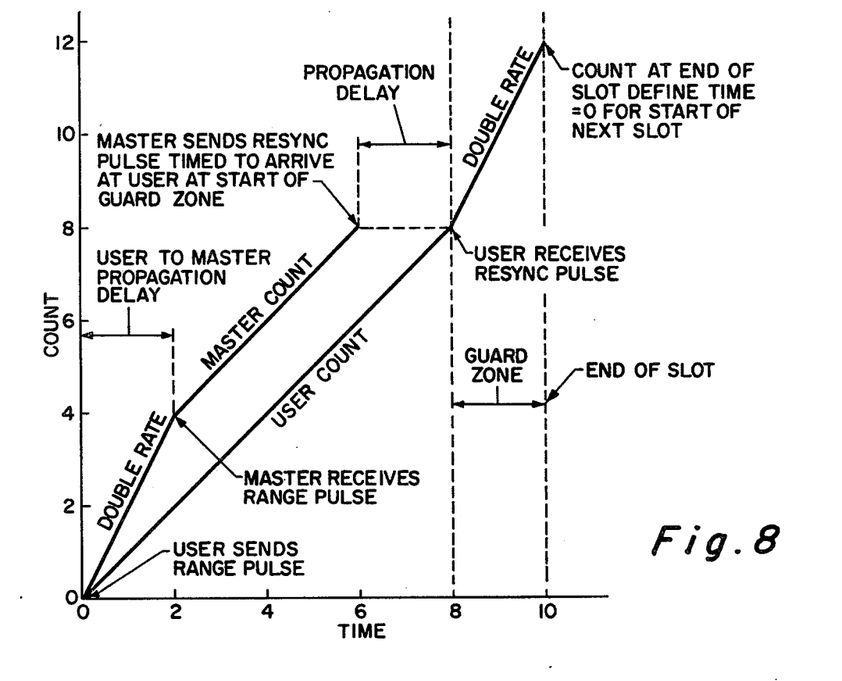
FIGS. 8, 9 and 10 are graphs indicating one manner in which the clocks employed in each user unit of the present concept are maintained in substantially exact synchronism with one another.

Referring first to FIG. 8 of the drawings, there is shown a graph of a properly-synchronized timing sequence. In this figure, time is illustrated in arbitrary units along the horizontal axis, and a quantity referred to as a "count" along the vertical axis, also in arbitrary units. At time zero, at the start of a time-slot, three operations occur simultaneously--(1) the user transmitter sends out a ranging pulse, (2) the counter at the user station starts counting units of time and accumulating "count", and (3) the master station also starts accumulating "count", but at a double rate, or two counts per unit of time. At some later point, shown as two units of time on the graph, the master station receives the user ranging signal. This time interval is shown as the propagation delay, and is the direct measure of the range from the transmitting user to the master station. When the master station receives the ranging signal, it shifts its count rate from double to single, as indicated by the change in slope of the master count line on the graph of FIG. 8. The user count continues at the initial single rate.

At some later time, the master station will transmit a re-synchronization pulse received by the user at exactly the same point in each time slot, namely, the start of the guard zone period. The guard zone is a silent interval at the end of each time slot during which there are no transmissions by users or master. To assure that the user receives the re-synchronization pulse at precisely this instant, the master must transmit the re-synchronization pulse at a time earlier than the start of the guard zone by the amount of the propagation delay. This time is shown on the graph of FIG. 8 as the cessation of master station counting.

The user station is shown as receiving the re-synchronization pulse at exactly the start of the guard zone. At that moment, the user station count is shifted to a double rate count for the guard zone period. It is to be noted that the master station has accumulated a count of eight units and the user station a count of twelve units.

Figure 9:
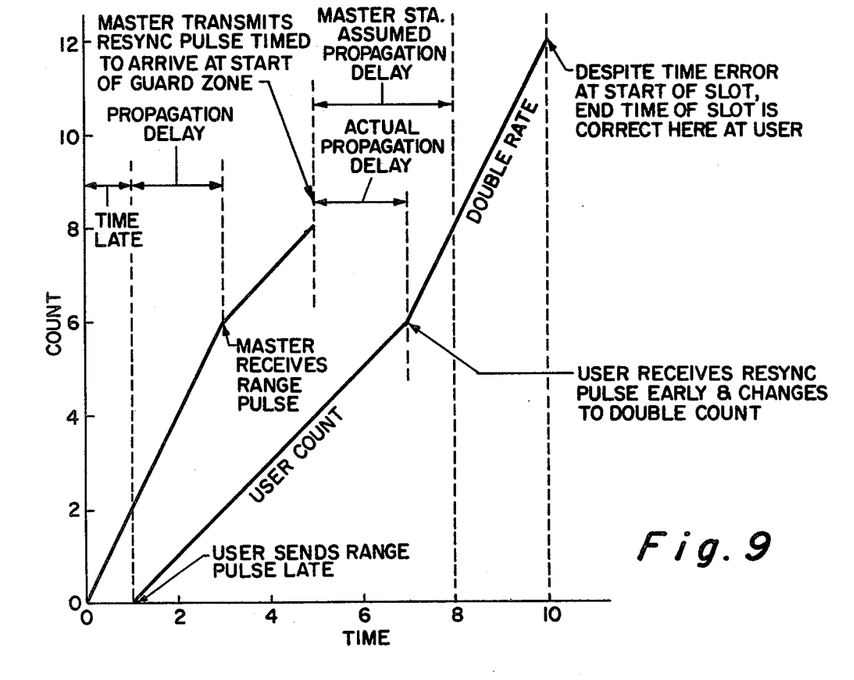

Referring now to FIG. 9, there is shown a situation when the user local oscillator has slipped in time so that it indicates the start of the time slot later than the proper time as kept by the clock at the master station. In FIG. 9, at time zero, the master station counter starts its double rate count. However, the user station, being late, does not transmit its range pulse until some time later, shown as time unit one on the graph. At that instant the range pulse is transmitted, and the user station starts accumulating count at the single rate.

At a later time the master station will receive the range pulse. The master station cannot determine that the time of reception of the range pulse also includes time due to the late transmission, and so the master station assumes that the propagation delay is the entire time from the start of the time slot to the reception of the range pulse. This is shown on the graph of FIG. 9 as propagation delay plus the time late. At the time of reception of the range pulse the master station will shift to single count.

At a time equal to the start of the guard zone less the assumed propagation delay the master station will stop its count and transmit the re-synchronization pulse. It is to be noted that this occurs at an accumulated count identical to that of the properly-synchronized case of FIG. 8, but at an earlier time.

However, because the actual propagation delay is less than that assumed by the master station, the user station will receive the re-synchronization pulse earlier than the start of the guard zone period. At this time its counter will shift to double rate count. It will be noted from the graph of FIG. 9 that the user unit will accumulate the count of twelve units at the end of the guard zone period. Thus, although the user local oscillator was slow at the start of the slot, the proper end of the slot has been re-determined correctly by defining it as the time at which the user unit attains the count of twelve.

By this combination of single and double rates, whatever the actual times involved in the length of a slot and the length of the guard zone, and whatever the actual propagation delay, the master station always transmits the re-synchronization pulse when it has accumulated a given count (a count of eight in the examples shown) and the end of the slot is always correctly defined when the user unit attains the proper count (a count of twelve in the examples shown).

Figure 10:
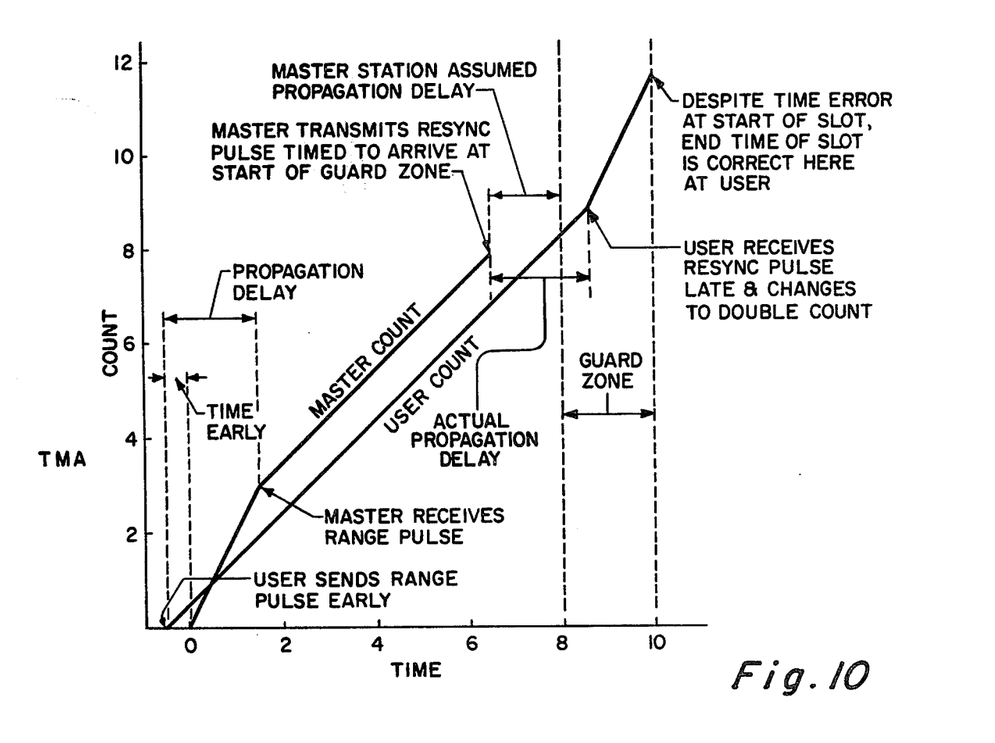

FIG. 10 of the drawings illustrates the opposite case when the user local oscillator is fast, or, in other words, the user clock is ahead of time. In such case, the same conditions hold; that is, the user will receive the re-synchronization pulse a little late (actually in the guard zone) but the end of the slot is still defined by the accumulation of the proper count. It is again seen that the master station transmits the re-synchronization pulse at a time defined by an accumulated count of eight, and that the user unit correctly determines the end of the slot when its counter has accumulated a count of twelve. The condition existing when the user local oscillator is ahead of time, as in FIG. 10, results in some portion of the time of propagation of the re-synchronization pulse falling within the guard zone. This possibility is one reason for maintaining such a guard zone in order to preclude the possibility of one re-synchronization pulse being on the air at the same time as another ranging pulse.

CYCLIC TRANSFER OF RE-SYNC FUNCTION

The process of clock re-synchronization as described above requires the presence of a line-of-sight between the master station and all of the stations being re-synchronized. However, since not all user stations will ordinarily be visible to the master, the present concept includes means for re-synchronizing the clocks in which each user station in turn acts as a master for the purposes of re-synchronizing. In other words, if there are 50 user stations within a community and the cycle of calling on each station requires two seconds, then each user acts as a re-synchronization station once ever 100 seconds. The stability of the local oscillators is such as to permit maintenance of suitable correct time to satisfactory tolerances over that period. Accordingly, during each 100-second period, each user station will have at least two opportunities for re-synchronization by the master, and most stations will have more. The minimum of two opportunities arises since each user station must be in contact directly with at least two others in order to permit position information to be developed.

It will be apparent from consideration of the re-synchronization graph of FIG. 8 that the initial portion of the time slot before the start of the guard zone must include a period of time equal to twice the maximum propagation delay expected from the furthest user. In other words, the ranging pulse from such furthest user must be received before the master can transmit the re-synchronization pulse. This fact places a limitation on the length of a time slot; that is, the latter must be long enough to include two propagation delay intervals plus a guard zone of sufficient length to assure that no confusion exists between one re-synchronization pulse and the ranging pulse from the next user (or the next data relay signal in the relay timing cycle). In addition, the guard zone allows time for multi-path reception of the re-synchronization pulses to occur without confusion with succeeding range pulses.

It will now be recognized that clock re-synchronization cannot be accomplished in the same manner as the relay cycle, since this would necessitate that all slave units be in line-of-sight relationship with the station performing the re-sync function. However, the assumption can be made that each unit will be in communication with at least three other stations, the minimum requirement for accurate ranging. Consequently, sequential shifting of the unit designated "sync" is feasible, and this concept forms an important part of the system being described.

In a preferred example, each unit within a community (see FIGS. 2 and 3) is designated as the "sync" unit for one cycle of the 80 stations of that community. During this 2-second period, all other stations in the community will sync on that unit. At the completion of this cycle, the next unit in sequence will become the sync unit, and all stations in line-of-sight communication will sync on this unit. This procedure will continue until all units have performed the sync function. Sync unit assignments are programmed into each clock along with the relay cycle data for the unit of which such clock forms a part.

To illustrate the above, if it be assumed that unit #6 is in communication with only unit #10 (which is in turn in communication with other units) it will still receive a sync signal once every 150 seconds. Since unit #10 is being synced by other stations, it will be receiving several sync signals. This action, when coupled with the accuracy of the pulse counter of each unit ($1 \times 10^9$) will maintain unit #6 in sync with all other stations.

It should be noted that, while cyclic syncing as above described provides for synchronization of units which are not in direct communication with each other, it also introduces the possibility of error oscillation if the re-sync cycle is allowed to run without interruption. Furthermore, it is essential that each sub-community be synchronized with all other sub-communities. To achieve this objective, the stations designated as sub-masters are not allowed to be synced by a subordinate unit, but instead are synced only by a main master. Each main master in turn is synced periodically by a single time reference clock, which will travel physically from master to master.

The above-described method of operation establishes a system of sync precedence in which the reference time from the master clock is employed to sync the sub-masters. The latter sync their subordinates within line-of-sight and the subordinates in turn sync each other. If a sync error exists at a subordinate station, the adjacent subordinate stations may also be synced to this erroneous signal. However, the sub-master will not re-sync on any signal from a subordinate, and, on the next cycle, the sub-master will correct the local sync.

The time slots that have not been assigned (or are not in operation in a community) will be open. No syncing will occur during these open time slots, since designation as a "sync unit" is accomplished without command from the master station, and is solely a function of the unit's counter and occurs only during its assigned time slot.

Obviously many modifications and variations of the present invention are possible in the light of the above teachings. It is therefore to be understood that within the scope of the appended claims the invention may be practiced otherwise than as specifically described.

What is claimed is:

1. A method of determining the position with respect to one another of a plurality of geographically-separated units, said method comprising:

transmitting from each unit in cyclic sequence, and in pre-assigned equally-spaced-apart coded time intervals, a ranging signal;

receiving the ranging signal so transmitted by each unit at each of the remaining units where such signal is detectable;

deriving at each unit from the time characteristics of the signal so received the range of that particular unit from the one at which the signal was transmitted;

relaying from each unit at which such range information is derived to a central point in cyclic sequence, and during the period between successive coded time intervals, the said range information; and correlating at such central point the range information thus relayed thereto so as to determine the position of said units with respect to one another.

2. A method of determining the position with respect to one another of a plurality of geographically-separated units, said method comprising:

transmitting from each unit in cyclic sequence, and in pre-assigned coded time intervals, a ranging signal;

receiving the ranging signal so transmitted by each unit at each of the remaining units of said plurality where such signal is detectable;

deriving at each unit from the time characteristics of the signal so received the range of that particular unit from the one at which the signal was transmitted;

storing at each unit in a memory the range data derived by that unit;

relaying from each unit to a central point in cyclic sequence the range data stored in its memory, such range data being relayed during the time period between successive coded time intervals for ranging signal transmission; and correlating at such central point the range data thus relayed thereto so as to determine the position of said units with respect to one another.

3. Apparatus for determining the position with respect to one another of a plurality of geographically-separated units, said apparatus comprising:

a timing device forming part of each unit;

means for synchronizing the operation of all such timing devices;

means incorporated into each unit and controlled by the timing device at such unit for transmitting a ranging signal during the initial portion of a pre-assigned time slot, the time slot pre-assigned to any one unit being distinct from the time slots pre-assigned to all other units, and the ranging signals so transmitted occurring in cyclic sequence with respect to one another;

means incorporated into each unit for receiving in cyclic sequence the ranging signals transmitted from said other units wherever such signals are detectable and for ascertaining the range from itself to the unit transmitting a particular detected ranging signal as a function of the signal propagation interval;

means incorporated into each unit for relaying to a central point during a terminal portion of each particular time slot the range data so ascertained from the ranging signal transmitted during the initial portion of that particular time slot; and means at such central point for receiving and correlating the range data so relayed by said units to determine the relative position of said units with respect to one another.

4. Apparatus for determining the position with respect to one another of a plurality of remotely-located units, said apparatus comprising:

means at each of said units capable of keeping accurate time within predetermined limits;

means at each of said units for transmitting a ranging signal controlled by said timekeeping means so that all such signals occur in cyclic sequence;

means at each of said units for receiving the ranging signals so transmitted wherever such signals are detectable and for deriving range data therefrom;

means at each of said units for relaying in cyclic sequence to a central point the range data derived thereby, a complete cyclic sequence of range data relaying by said units occurring following the transmission of a ranging signal by each particular unit; and means at said central point for receiving and correlating the range data so relayed.

5. A system for determining the position of each of a plurality of stations within a geographical region with respect to each of the remaining stations in such region, said system comprising:

means at each of said stations for transmitting in cyclic sequence a signal during a pre-assigned period of time different from the periods of time respectively pre-assigned for signal transmission to all other stations within said region;

means at each of said stations for receiving, from each of the other stations within its line-of-sight, the signal so transmitted and for ascertaining the range from itself to each such transmitting station;

means at each station for cyclically relaying the range data so ascertained to a remote point during pre-assigned periods of time different from the periods of time respectively pre-assigned to all other stations for range data relaying and also different from all the periods of time respectively pre-assigned to said stations for transmitting a signal; and means at said remote point for receiving the range data so relayed from all of said stations within line-of-sight thereto; and means at said remote point for correlating the range data so received to determine the position of each station with respect to all of the remaining stations within said region.

6. A method which comprises:

(a) transmitting a ranging signal in cyclic sequence from each of a plurality of geographically-separated units;

(b) receiving said ranging signal at all of said units, except the particular one then transmitting, wherever said signal is detectable;
(c) deriving the range from each unit receiving said signal to the point of transmission as a function of the signal propagation time;
(d) relaying to a central point the range information so derived from each unit where such information is available;
(e) receiving the relayed range information at said central point; and
(f) correlating the received range information to determine the relative location of those of said plurality of units concerning which range information has been received from at least two other units.

* * * * *